United States Patent
Inoue et al.

(10) Patent No.: US 6,337,728 B1
(45) Date of Patent: Jan. 8, 2002

(54) LIQUID CRYSTAL DISPLAY DEVICE WITH SPACER MATERIAL COVERED BY AN ORIENTATION FILM

(75) Inventors: Keiko Inoue, Hitachiota; Shigeru Matsuyama, Mobara; Setsuo Kobayashi, Mobara; Hiroaki Asuma, Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/168,287

(22) Filed: Oct. 8, 1998

(30) Foreign Application Priority Data

Oct. 13, 1997 (JP) .............................. 9-278575

(51) Int. Cl.$^7$ .......................................... G02F 1/1339
(52) U.S. Cl. .................................................... 349/155
(58) Field of Search ........................ 349/141, 106, 349/110, 155

(56) References Cited

U.S. PATENT DOCUMENTS

| | | | | |
|---|---|---|---|---|
| 4,341,445 A | * | 7/1982 | Matsuyama et al. | 350/344 |
| 4,391,491 A | * | 7/1983 | Freer et al. | 349/153 |
| 5,220,446 A | * | 6/1993 | Rho | 349/155 |
| 5,358,810 A | * | 10/1994 | Yoshino | 430/20 |
| 5,598,285 A | * | 1/1997 | Kono et al. | 349/39 |
| 5,610,740 A | * | 3/1997 | Kamamori et al. | 349/110 |
| 5,745,207 A | * | 4/1998 | Asada et al. | 349/141 |
| 5,760,857 A | * | 6/1998 | Yanagawa et al. | 349/43 |
| 5,880,803 A | * | 3/1999 | Tamai et al. | 349/156 |
| 5,982,466 A | * | 9/1999 | Choi et al. | 349/124 |
| 6,097,467 A | * | 8/2000 | Fujimaki et al. | 349/141 |

FOREIGN PATENT DOCUMENTS

| | | | | |
|---|---|---|---|---|
| JP | 63-113424 | * | 5/1988 | 349/155 |
| JP | 1-164924 | * | 6/1989 | 349/155 |

* cited by examiner

*Primary Examiner*—Ken Parker
(74) *Attorney, Agent, or Firm*—Antonelli, Terry, Stout & Kraus, LLP (57) ABSTRACT

A liquid crystal display device capable of preventing occurrence of display irregularity due to movement of spherical spacer materials. The liquid crystal display device includes a pixel electrode and counter electrode that are formed on a liquid crystal-side surface of one transparent substrate of respective transparent substrates disposed opposing each other with a liquid crystal being laid therebetween, wherein the transmissivity of light transmitting between this pixel electrode and the counter electrode is controlled by twisting of molecules of the liquid crystal as caused by an electric field generated between the pixel electrode and counter electrode. In the liquid crystal display device, spacer materials are provided between respective ones of said transparent substrates. These spacers are fixed and disposed on an insulating layer underlying an orientation film which is in contact with said liquid crystal on the one transparent substrate side.

2 Claims, 7 Drawing Sheets

LIQUID CRYSTAL DISPLAY DEVICE WITH SPACER MATERIAL COVERED BY AN ORIENTATION FILM

BACKGROUND OF THE INVENTION

1. Field of the Invention

The present invention relates in general to liquid crystal display devices and, in more particular, to a liquid crystal display device of the type which is called the "lateral electric field" scheme.

2. Description of the Related Art

A liquid crystal display device of the type which is called the "lateral electric field" scheme is arranged in a manner such that a pixel electrode and a counter electrode are formed on a surface on one transparent substrate side of respective transparent substrates which are disposed opposing each other with a liquid crystal being disposed between them, wherein the transmissivity of rays of light that transmit between these pixel electrode and counter electrode is controlled by twisting of molecules of the liquid crystal due to an electric field as created between the pixel electrode and counter electrode.

As apparent from this, the twisting of molecules of the liquid crystal is achieved by electric field components that are generated substantially in parallel with the transparent substrates. This is the main reason why the liquid crystal display device of this type is called the lateral electric field scheme.

Such a liquid crystal display device is capable of recognizing clear or "crisp" images even when observing them from a view point at an increased angle relative to the display plane thereof.

In order to increase and render uniform those components of the electric field generated within the liquid crystal which are in an almost parallel direction with the transparent substrates, it becomes important to establish a constant layer thickness of this liquid crystal in view of the fact that the liquid crystal thickness is also related thereto.

For this reason, a great number of bead-shaped distance pieces or spacer materials of the same diameter, for example, are disposed and scattered between the respective transparent substrates along with the liquid crystal, which substrates are disposed opposing each other.

These spacer beads are such that they are scattered on at least one substrate at a process step prior to assembly of two transparent substrates thereby allowing the spacer beads to reside between the transparent substrates.

However, it has been affirmed by vibration tests for device transportation that the liquid crystal display device with the above-mentioned configuration suffers from the risk of display irregularity which can occur due to movement of the spacer beads between the transparent substrates.

More specifically, this is because execution of vibration tests results in vibration of each of mutually opposing transparent substrates thereby causing the liquid crystal to flow and move, which in turn lets the spacers move accordingly whereby a change in orientation state thereof takes place at portions of an orientation film corresponding to such movement locus.

SUMMARY OF THE INVENTION

The present invention has been made by taking the technical background into consideration, and its object is to provide a liquid crystal display device capable of eliminating the display irregularity otherwise occurring due to movement of spacer materials.

A brief description of the summary of a representative one of the inventive principles as disclosed in the subject patent application is as follows.

In accordance with one aspect of the invention, a liquid crystal display device wherein a pixel electrode and a counter electrode are formed on a liquid crystal-side surface of one transparent substrate of respective transparent substrates which are so disposed as to oppose each other with a liquid crystal being laid therebetween, and wherein the transmissivity of light transmitting between these pixel electrode and counter electrode is controlled by twisting of molecules of the liquid crystal as caused by an electric field created between the pixel electrode and counter electrode, featured in that spacer materials are provided between respective ones of said transparent substrates, and that these spacer materials are fixed and disposed on an insulating layer underlying an orientation film which is in contact with said liquid crystal on the one transparent substrate side.

With the liquid crystal display device thus arranged, in view of the fact that the spacer materials placed between the transparent substrates are immovably mounted on the side of one transparent substrate, it becomes possible to eliminate movement of the spacer materials.

The spacer materials are arranged such that these are fixed to an insulating layer underlying an orientation film, and are also arranged so that they are covered and fixed by this orientation film.

This is in order that employment of the structure for causing the spacer materials to be also covered by the orientation film prevents an increase in a change of the state of orientation of liquid crystal around the spacer materials used.

Note also that in the case where the spacer materials are fixed to the orientation film, the arrangement is capable of avoiding the need for complicated works, such as ones which require addition of surface adhesion processing of the spacer materials.

In other words, this is because in the case the spacer materials are fixed to the insulating layer, it is possible to let the spacers tightly adhere to the insulating layer by forcing, for example, such spacers to scatter or distribute prior to hardening of the insulating layer and then effectuating appropriate heat application thereto in the hardening process.

In accordance with another aspect of the invention, the liquid crystal display device with the aforesaid configuration features in that said spacers are fixed to an insulating layer underlying an orientation film as contacted with said liquid crystal on the liquid crystal-side surface of the other transparent substrate of the respective transparent substrates.

The liquid crystal display device arranged as described above is configured in a manner such that the spacer materials are immovably attached to one specific transparent substrate of the pair of transparent substrates which is on the side with the pixel electrode and counter electrode not being formed thereon.

Due to formation of none of the respective electrodes, an insulating layer is typically formed underlying the orientation film which must be formed in contact with the liquid crystal; thus, it becomes possible to attain the intended arrangement capable of immovable attachment to this insulating layer without having to specially modify the configuration of any remaining portions.

By way of example, where an electrode (typically, formed beneath the orientation film) was formed on the transparent substrate on the side of adhesion of spacer materials, the electrode must be subject to design alteration or redesign, such as formation under the insulating layer, which would result in an electric field being created via the insulating layer between the electrode and another electrode associated therewith, thereby causing a problem that the electric field affecting the liquid crystal decreases in intensity.

It should be noted here that the term "insulating layer" as used herein may principally refer to the other electrically insulative films, including a black matrix layer, color filter and any equivalents thereto.

In accordance with a further aspect of the invention, in the above-mentioned arrangement, said insulating layer is featured in that it is a flat, planarized film which covers a black matrix layer and a color filter.

The liquid crystal display device arranged as described above is configured so that a step-like difference, which may be formed due to layout of the black matrix layer and color filter with their portions overlapping each other, will no longer be observable on the surface thereof by the presence of the planarized film.

Accordingly, it is possible to make uniform the distribution layout of the spacer materials on the planarized film surface while simultaneously enabling adhesion on this planarized film to remain uniform.

DETAILED DESCRIPTION OF THE INVENTION

One preferred embodiment of the liquid crystal display device in accordance with the present invention will be described with reference to the accompanying drawings.

Overall Configuration

Figure 2:
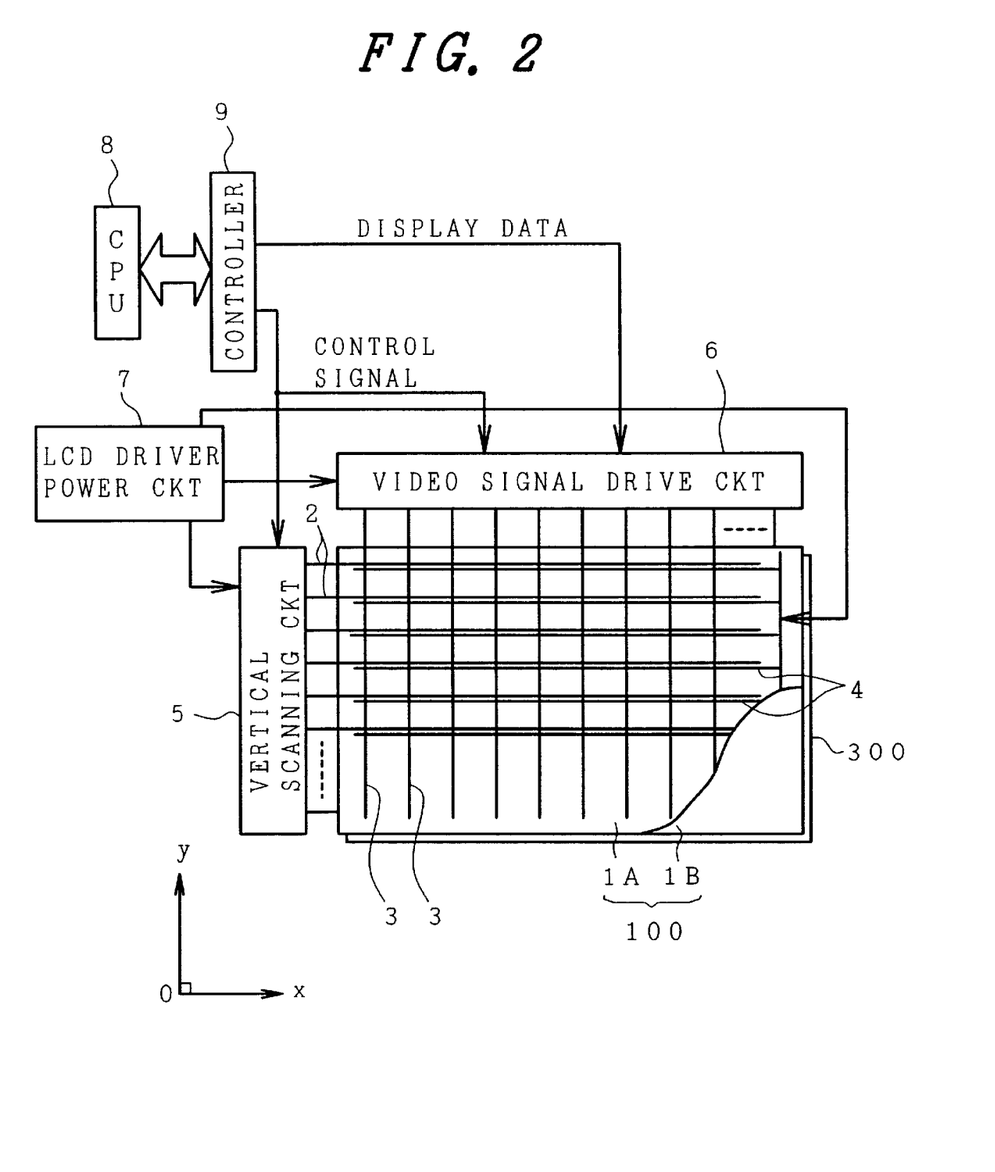
FIG. 2 is an equivalent circuit diagram showing one embodiment of an overall configuration of the liquid crystal display device in accordance with the present invention.

FIG. 2 is a circuit diagram showing one embodiment of the liquid crystal display device in accordance with the present invention.

First of all, there is a liquid crystal display panel 300 of the so-called "active matrix" type. This liquid crystal display panel 300 is arranged in a manner such that its display section is constituted from an ensemble of a plurality of pixels that are disposed in a matrix form, wherein each pixel is arranged so that transmission light from a back-light unit (not shown) disposed behind the liquid crystal display panel is uniquely modulation-controllable.

The optical modulation at each pixel employs a certain method called the "lateral electric field" scheme. As will be later described in detail, the configuration thereof is such that an electric field created inside the liquid crystal laid between transparent substrates 1A, 1B which are so disposed as to oppose each other is in a parallel direction with these transparent substrates 1A, 1B.

The liquid crystal display panel 300 thus arranged has been well known as the one which is capable of recognizing a crisp image even when observing from a view field at large angles with respect to the display plane thereof—namely, the one that is excellent in what is called the wide view field angle.

More specifically, scan signal lines 2 and reference signal lines 4 are formed on a liquid crystal-side surface of one transparent substrate 1A of the transparent substrates 1A, 1B which are disposed opposing each other with the liquid crystal of this liquid crystal display panel 300 being laid therebetween, the signal lines extending in the x direction (row direction) of the transparent substrate and being provided in parallel along the y direction (column direction).

In this case, in the same drawing, the signal lines are successively laid out in a specified order—looking at from the upper side of the transparent substrate 1A—of a scan signal line 2, a reference signal line 4 adjacent to this scan signal line 2, a scan signal line 2 spaced apart by a relatively large distance from this reference signal line 4, and a reference signal line 4 adjacent to this scan signal line 2, . . . .

Image signal lines 3 are formed so that these extend in the y direction and are provided in parallel along the x direction while they are electrically insulated from these scan signal lines 2 and reference signal lines 4.

Here, each rectangular region of a relatively wide area which is surrounded by respective ones of the scan signal lines 2 and reference signal lines 4 as well as image signal lines 3 becomes a region in which a unit pixel is formed. These respective unit pixels are disposed in the form of a matrix thereby constituting a display plane. Note that a detailed configuration of this pixel will be described in detail later.

The liquid crystal display panel 300 is provided as its external circuits with a vertical scanning circuit 5 and an image signal driving circuit 6, wherein the vertical scan circuit 5 is operable to sequentially supply a scan signal (voltage) to respective ones of said scan signal lines 2, thereby permitting an image signal (voltage) to be supplied from the image signal drive circuit 6 to the image signal lines 3 at a timing as synchronized therewith.

Additionally, the vertical scan circuit 5 and image signal drive circuit 6 are supplied with electric power from a liquid crystal drive power supply circuit 7 while simultaneously allowing image information from a CPU 8 to be input by a controller 9 to the circuits, respectively, in a way such that the information is divided into display data and a control signal.

The reference signal lines are also arranged such that a reference signal (at a fixed voltage potential, for example) is supplied from the liquid crystal drive power supply circuit 7.

Pixel Configuration

Figure 3:
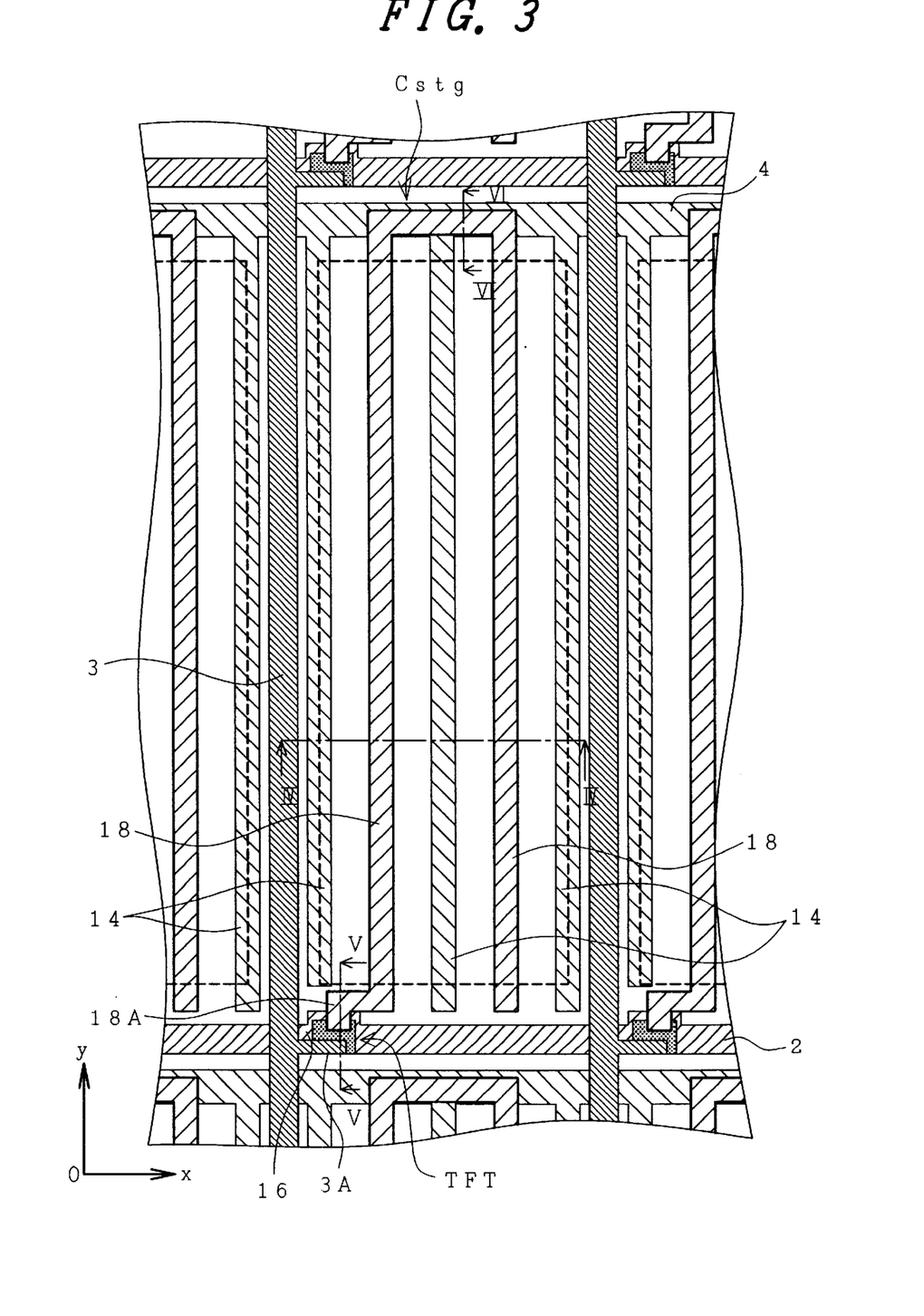
FIG. 3 a plan view diagram showing one embodiment of a pixel region of the liquid crystal display panel of the liquid crystal display device in accordances the present invention.
Figure 4:
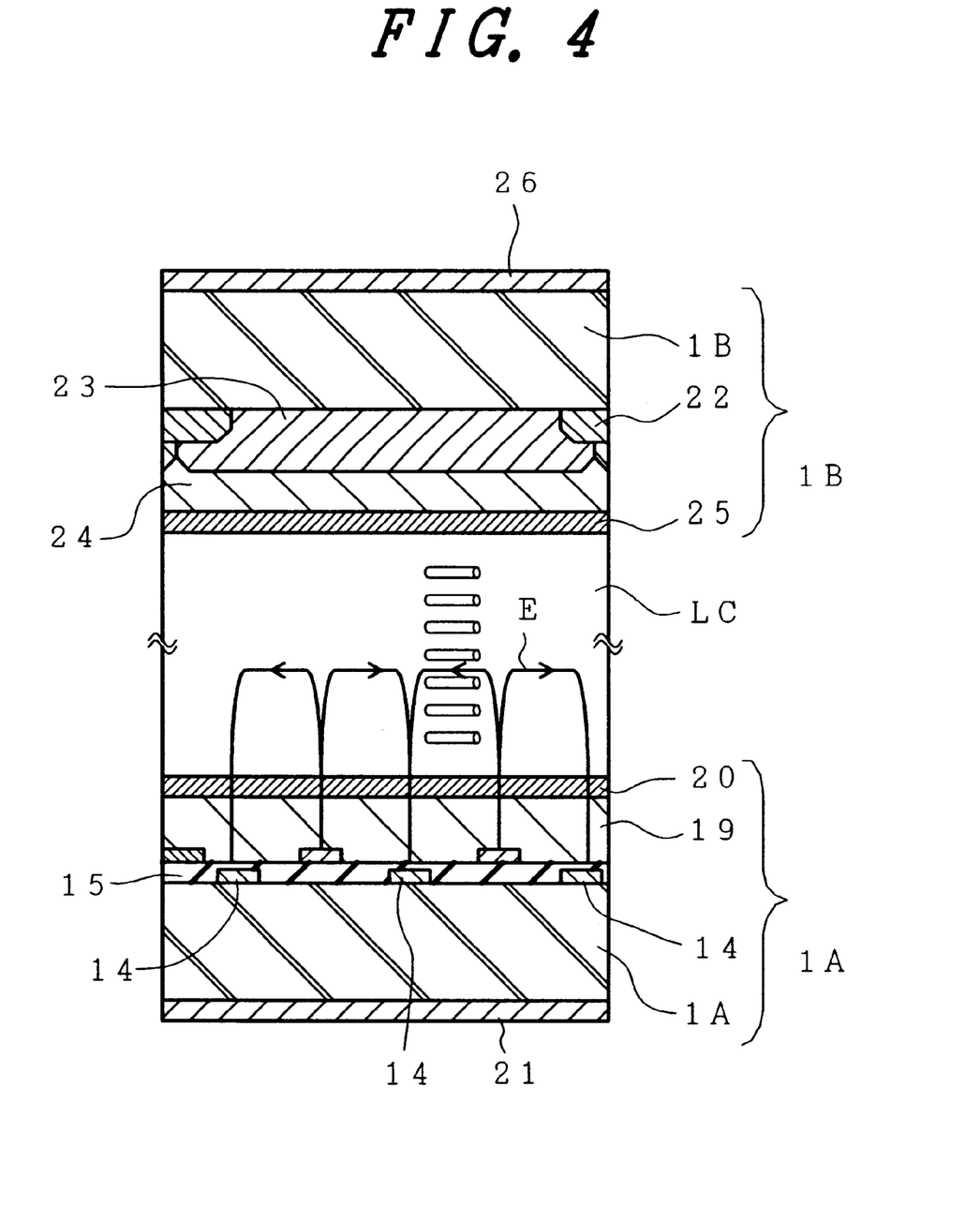
FIG. 4 is a sectional view along the line IV—IV of FIG. 3.
Figure 5:
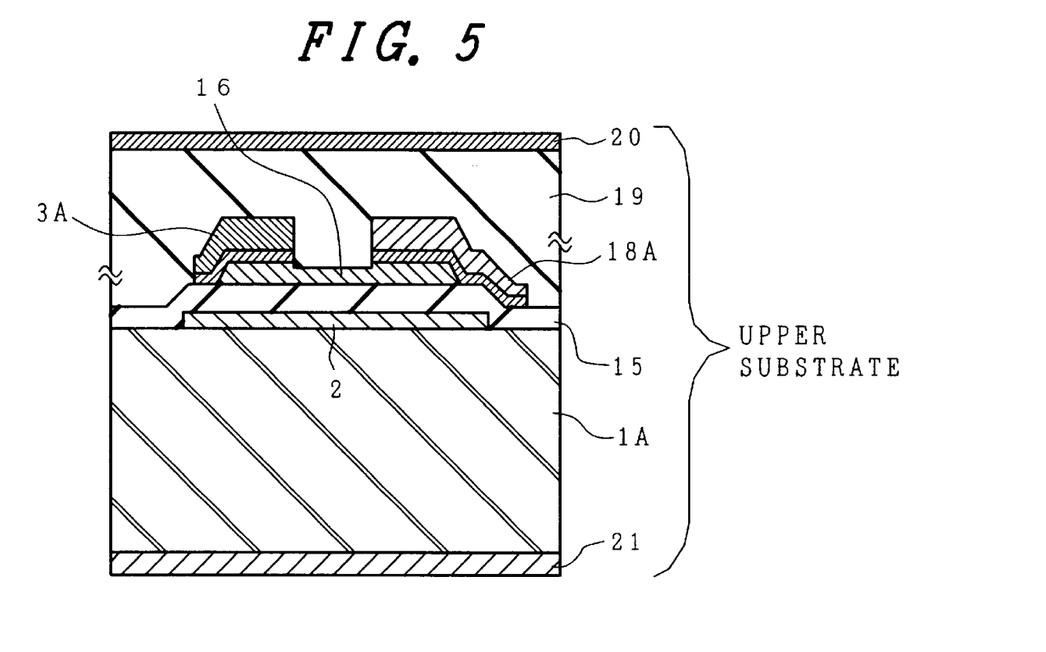
FIG. 5 is a sectional view along line V—V of FIG. 3.
Figure 6:
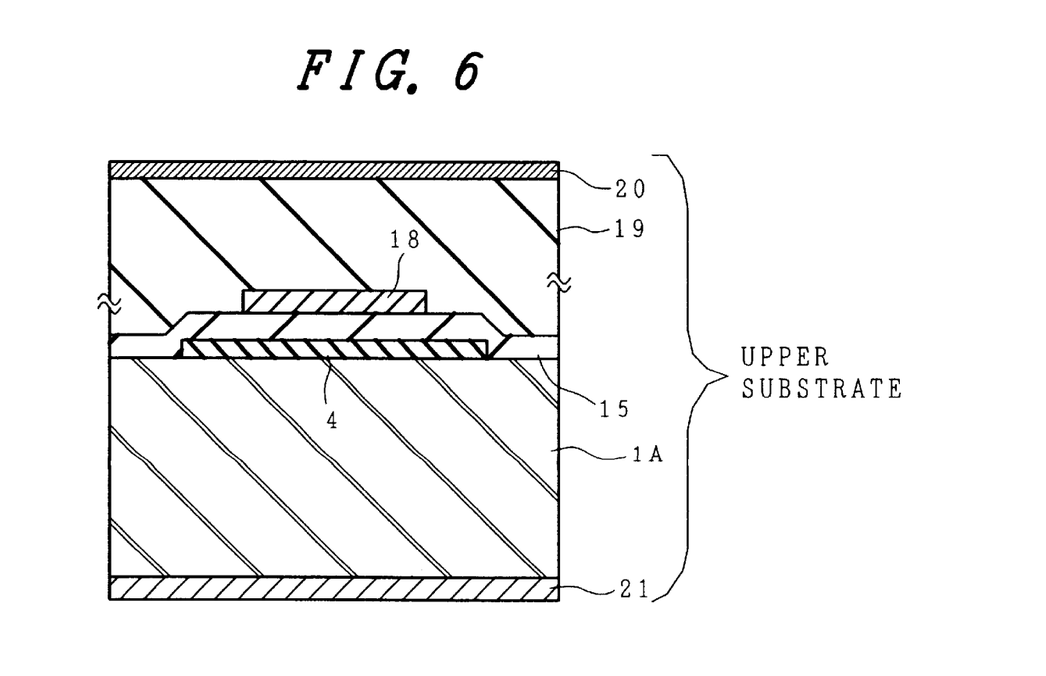
FIG. 6 is a sectional view along line VI—VI of FIG. 3.

FIG. 3 is a plan view showing one embodiment of said unit pixel (corresponding to a certain region as surrounded by dotted lines of FIG. 2). Note that a cross-section taken along the line VI—VI of FIG. 3 is illustrated in FIG. 4; a cross-section along line V—V is depicted in FIG. 5; and, a cross-section along line VI—VI is shown in FIG. 6.

In FIG. 3, one reference signal line 4 extending in the x direction and a scan signal line 2 that is in parallel with this reference signal line 4 and is relatively significantly distant from the reference signal line 4 in the (−) y direction are formed on the principal surface of the transparent substrate 1A.

Here, three counter electrodes 14 are integrally formed to the reference signal line 4. More specifically, two counter electrodes 14 of them are so formed as to extend in the (−) y direction up to a nearby location of the scan signal line 2 while it remains adjacent to one y-direction side of the pixel region which is defined by a pair of image signal lines 3 as will be described later—that is, near said respective image signal lines 3, while the remaining single counter electrode is formed between them.

An insulating layer 15 (see FIG. 4, FIG. 5 and FIG. 6) which is made of a silicon nitride film for example is formed on the surface of the transparent substrate 1A with these scan signal lines 2, reference signal lines 4 and counter electrodes 14 being formed thereon in such a manner that the insulating layer also covers these scan signal lines 2 and others. This insulating layer 15 is arranged so that it functions as an interlayer insulating layer for intersections of the scan signal lines 2 and reference signal lines 4 with respect to the image signal lines 3 as will be later described, and serves as a gate insulation film with respect to thin-film transistor TFT formation regions, and further acts as an insulating layer with respect to storage capacitance Cstg formation regions.

A semiconductor layer 16 is first formed on the surface of this insulating layer 15 at the thin-film transistor TFT formation regions thereof. This semiconductor layer 16 is made of amorphous Si, for example, and is also formed overlapping those portions near the image signal lines 3 at locations overlying the scan signal lines 2. This, this configuration allows part of the scan signal lines 2 to act as the gate electrode of a thin-film transistor TFT.

As shown in FIG. 3, the image signal lines 3 are formed on the surface of the insulating layer 15 formed as described above, wherein the image signal lines extend in the y direction of the insulating layer and are provided in parallel with one another along the x direction.

The image signal lines 3 are provided with a drain electrode 3A which is integrally formed so that it extends up to part of the surface of said semiconductor layer 16 of the thin-film transistor TFT.

Further, pixel electrodes 18 are formed on the surface of the insulating layer 15 in the pixel region. This pixel electrode 18 is formed running between adjacent ones of said counter electrodes 14. More specifically, the pixel electrode 18 has one end which serves also as the source electrode 18A of said thin-film transistor TFT, and continuously extends in the (+) y direction, further extends in the x direction along the part overlying the reference signal line 4, and thereafter extends in the (−) y direction to thereby define the square bracket (])-like shape having the other end.

In this case, a portion of the pixel electrode 18 which overlaps the reference signal line 4 constitutes a storage capacitor Cstg between it and said reference signal line 4, which capacitor comprises said insulating layer functioning as the insulating layer. This storage capacitor Cstg exhibits an effect of long storing image information on the pixel electrode 18 when the thin-film transistor TFT is turned off, by way of example.

It is noted that the semiconductor layer 16 is doped with phosphorus (P) at its surface that corresponds to the interface between the above-mentioned thin-film transistor TFT's drain electrode 3A and source electrode 18A, thus defining therein a high concentration layer, to thereby attempt to provide an ohmic contact at each said electrode. In this case, said high concentration layer is formed in the entire area of the surface of the semiconductor layer 16, wherein after formation of each said electrode, the electrode is used as a mask to etch the high concentration layer other than the electrode formation region, thereby attaining the aforesaid structure.

A protective film 19 (see FIG. 4, FIG. 5 and FIG. 6), which is comprised of for example a silicon nitride film, is formed on the upper surface of the insulating layer 15 on which the thin-film transistor TFT, the image signal lines 3, the pixel electrodes 18 and the storage capacitor Cstg have been formed in the way stated supra; an orientation film 20 is formed on the upper surface of this protective film 19 thus constituting the transparent substrate 1A of the liquid crystal display panel 100. Additionally, a polarization plate 21 is disposed on the surface of this transparent substrate 1A which is opposite to the liquid crystal layer side.

As shown in FIG. 4, a black matrix layer 22 is formed at part on the liquid crystal side of the transparent substrate 1B while partitioning a display region into respective pixels. This black matrix layer 22 is the one which has a function of preventing light from being directly irradiated onto said thin-film transistor TFT and a function of improving the display contrast. This black matrix layer 22 is formed in the region shown by dotted lines in FIG. 3 to thereby define an opening or aperture section as formed therein constituting a substantial, pixel.

Further, a color filter 23 is formed covering the opening section of the black matrix layer 22; this color filter 23 is arranged to have a different color from that in a neighboring pixel region in the x direction and also have boundary sections on the black matrix layer 22, respectively. In addition, a flat, planarized film 24 comprised of a resin film or the like is formed on the surface on which the color filter 23 is formed in this way, while an orientation film 25 is formed on the surface of this flat film 24. Note here that a polarizer plate 26 is disposed on the surface of this transparent substrate 1B on a specified side that is opposite to the liquid crystal layer side.

Figure 7:
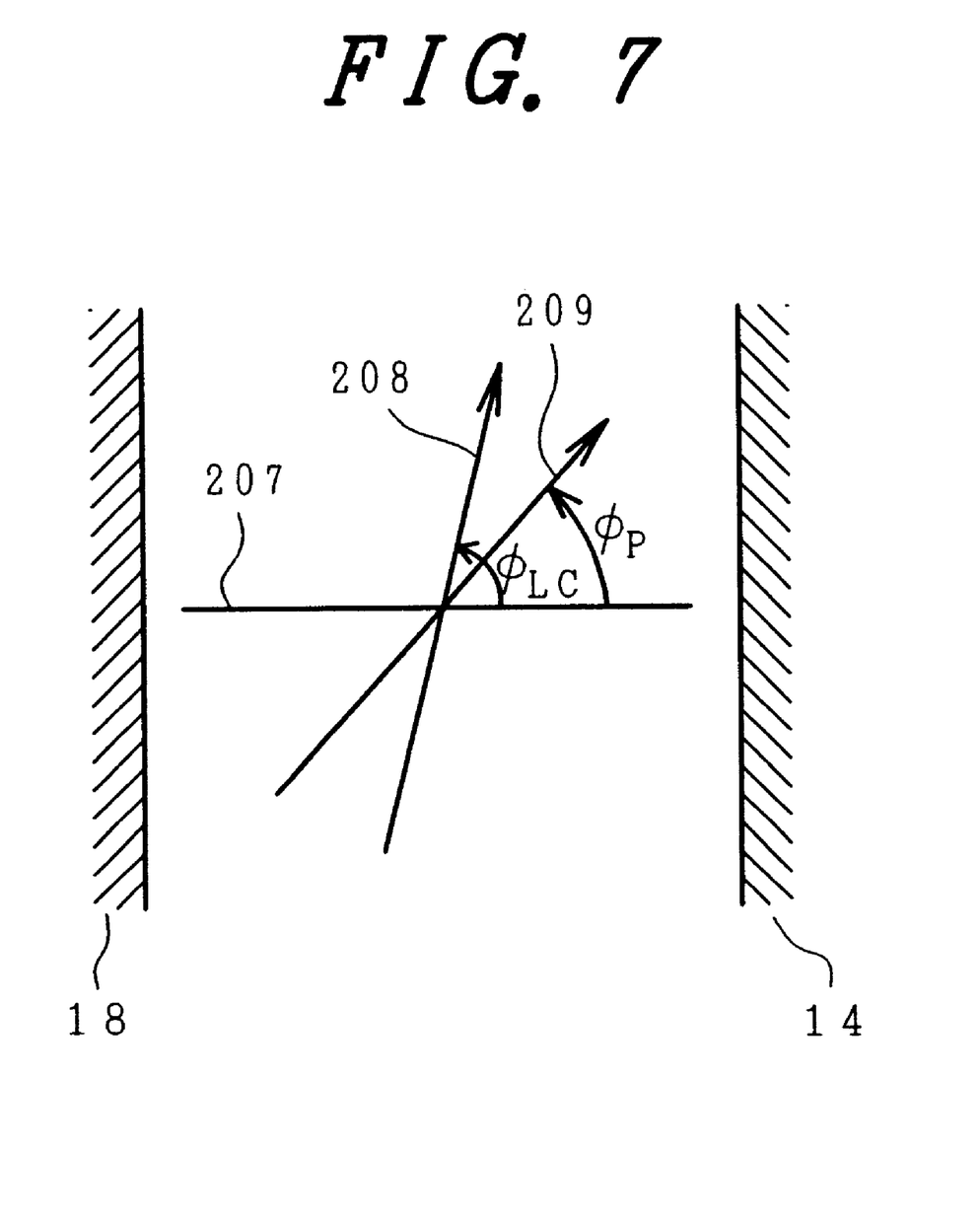
FIG. 7 is an explanation diagram showing a relation of the electric field direction versus the rubbing direction as well as a polarizer plate of the liquid crystal display panel of the liquid crystal display device in accordance with the present invention.

An explanation will here be given, with reference to FIG. 7, of a relation of the orientation film 20 and polarizer film 21 being formed on the side of the transparent substrate 1A versus the orientation film 25 and polarizer plate 26 as formed on the transparent substrate 1B side.

The angle of a rubbing direction 208 of any one of the orientation films 20 and 25 relative to the direction 207 of an electric field applied between the pixel electrode 18 and the counter electrode 14 is $\phi/LC$. Additionally, the angle of a polarization transmission axis direction 209 of one polarizer plate 21 is $\phi/P$. The polarization transmission axis of the other polarizer plate 26 is at right angles with o/P. Here, $\phi/LC=\phi/P$. A nematic liquid crystal composition is used as the liquid crystal layer LC, which is such that the dielectric constant anisotropy $\Delta\epsilon$ is positive in polarity and is 7.3 (1 kHz) in value whereas the refractive index anisotropy $\Delta n$; is 0.073 (589 nm, 20° C.).

An arrangement of the orientation films 20, 25 and polarizer plates 21, 26 and the like which comprise the relationship described above is what is called the "normally black mode," wherein an electric field E is created within the liquid crystal layer LC in a parallel direction with the transparent substrate 1A thereby causing light to penetrate the liquid crystal layer LC. However, it would be readily appreciated that this embodiment should not be limited to such normally black mode only and may alternatively employ the normally white mode in which light passing through the liquid crystal layer LC is maximized when no electric field is present.

Overall Sectional Configuration of LCD Panel

Figure 1:
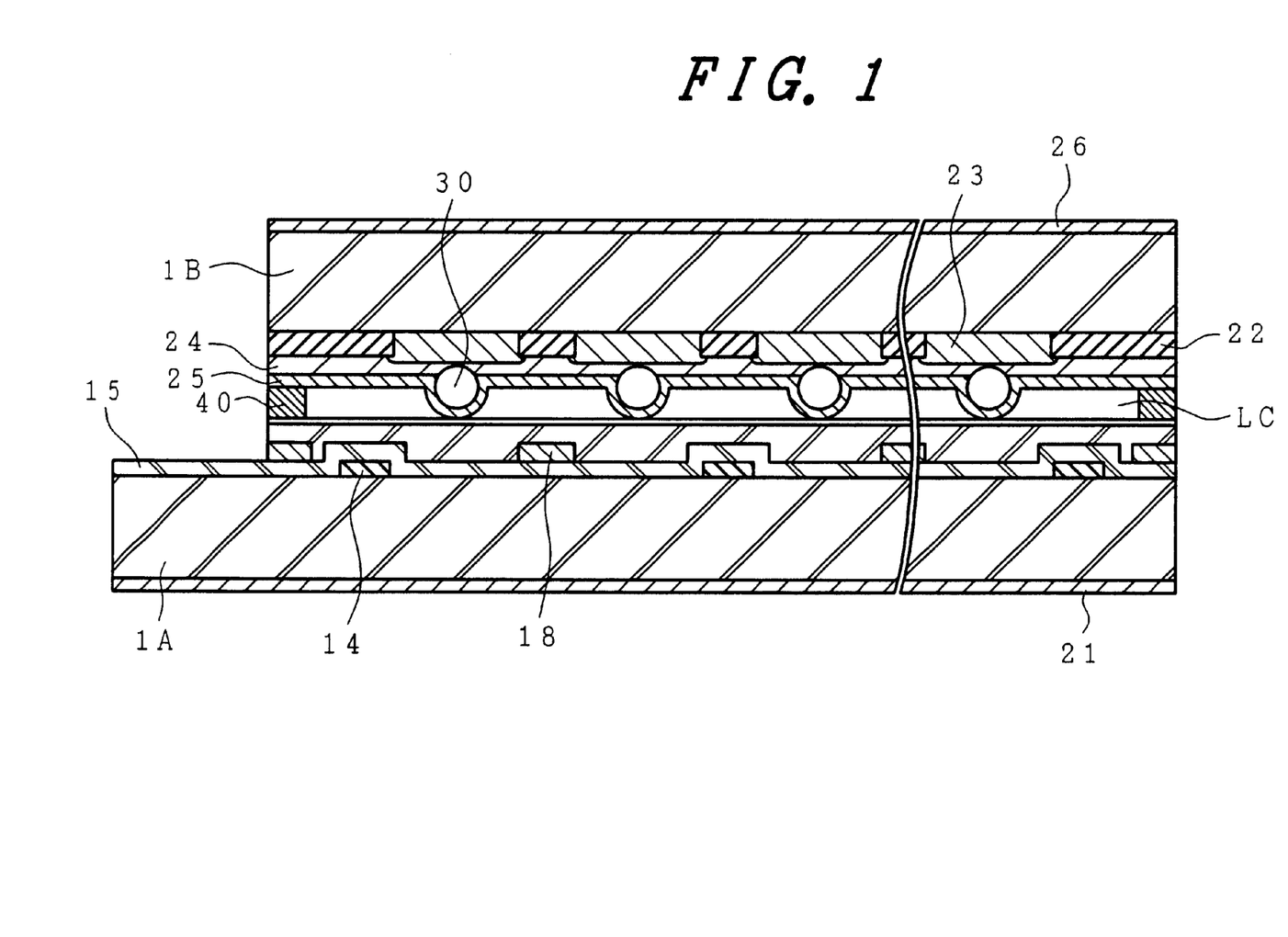
FIG. 1 is a sectional diagram showing one preferred embodiment of a liquid crystal display panel of a liquid crystal display device in accordance with the present invention.

FIG. 1 is a configuration diagram showing an overall cross-sectional view of a liquid crystal display panel. The sectional diagram corresponding to one pixel in this drawing corresponds to a depiction of FIG. 4.

FIG. 1 shows in particular that a plurality of spherical or bead-like spacer beads 30 of the same diameter are scattered or distributed between respective transparent substrates 1A, 1B. As described previously, the use of these spacer beads 30 is to control the distance between respective transparent substrates 1A, 1B, and, in turn, the layer thickness of the liquid crystal LC.

Here, the spacer beads 30 are of the bead-like shape, for example, and are comprised of a chosen material such as divinylbenzen, styrene or the like, which is polymer.

These spacer beads 30 are immovably mounted and formed on the flat film 24 on the other transparent substrate 1B side, which is different from the transparent substrate 1A with the pixel electrodes 18 and counter electrodes 14 being formed thereon.

In this case, immovable mounting or adhesion of the spacer beads 30 with respect to the flat planarized film 24 is achieved by use of a method or the like which includes, for example, the steps of forming the flat film, scattering thereafter the spacers prior to hardening thereof, and then effectuating appropriate heat application during the hardening process to thereby tightly adhere them to the flat film 24.

By such adhesion of the spacer beads 30 to the flat film 24, the orientation film 25 which is formed on the upper surface of the flat film 24 will be formed so that it covers the surfaces of the spacer beads 30, also.

It has been confirmed that when compared to prior art structures wherein the orientation film 25 is formed for example in the entire area of the surface of the flat film 24 with the spacer beads 30 being in contact with this orientation film 25, the liquid crystal is improved in orientation characteristic at portions near or around the spacer beads 30.

The liquid crystal display device thus arranged is capable of eliminating movement of the spacer beads 30 due to the fact that the spacer beads 30 laid between the transparent substrates 1A, 1B are fixed to the side of one transparent substrate (in this embodiment, transparent substrate 1B).

The spacer beads 30 are configured in a manner such that it is fixed to the flat film underlying the orientation film 25, and is not directly fixed to the orientation film 25.

This is for preventing a change in state of orientation of the liquid crystal from increasing at locations around, the spacer beads 30, by employing such specific structure with the spacer beads 30 being also covered by the orientation film 25.

In addition, the arrangement offers an advantage that where the spacer beads 30 are fixed to the orientation film 25, it is possible to avoid the need for any time-consuming and troublesome works including, but not limited to, the one that requires addition of adhesion processing of the spacer beads 30 to the surface.

In other words, this is because in the case where the spacer beads 30 are fixed to the flat film 24, it becomes possible to tightly adhere them to the flat film 24 by scattering the spacers before hardening of the flat film and then effectuating appropriate thermal processing in the hardening process.

Although the above-described embodiment is arranged so that the spacer beads 30 are fixed to the flat film 24, the principle is also applicable to those liquid crystal display devices with the flat film 24 not being present.

In this case, the spacer beads 30 are fixed to either the black matrix layer 22 or the color filter 23 with the orientation film 25 being formed to cover these spacer beads 30 and black matrix layer 22 as well as color filter 23.

This is because the same effects are obtained even in such case, also.

Note in the same drawing that a seal material 40 is formed along the edges of respective transparent substrates 1A, 1B to have an opening section as formed at part of such seal material, from which opening the liquid crystal is to be introduced for sealing.

Manufacturing Method

FIGS. 8A to 8G are process diagrams showing one embodiment of a manufacturing method of one transparent substrate 1B of the transparent substrates 1A, 1B, which is on the side with the pixel electrodes 8 and counter electrodes 14 not being formed.

Below is an explanation in the order of process steps.

Figure 8A:
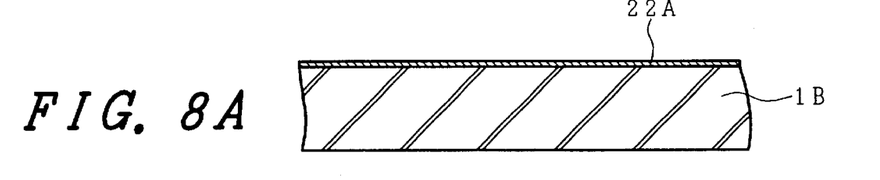
FIGS. 8A through 8G are process diagrams showing one embodiment of a manufacturing method of the liquid crystal display panel of the liquid crystal display device in accordance with the present invention.

Step A, FIG. 8A

Prepare the transparent substrate 1B; after washing its surface, form a synthetic resin layer 22A in the entire area of its principal surface, which layer contains therein carbon, for example.

Figure 8B:
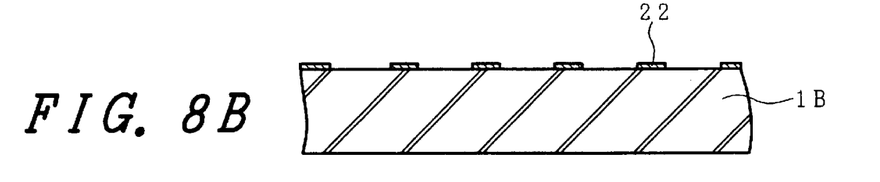

Step B, FIG. 8B

Coat a photoresist film on the overall surface of the synthetic resin layer 22A; then, let by photolithography techniques the photoresist film reside only in those regions corresponding to the black matrix layer formation regions while removing away the remaining ones.

Further, with the residual photoresist film being used as a mask, etch said synthetic resin layer 22A which has been exposed from this photoresist film.

It is thus possible, by removing the photoresist film used as the mask, to obtain the intended black matrix layer 22 of a desired pattern.

Figure 8C:
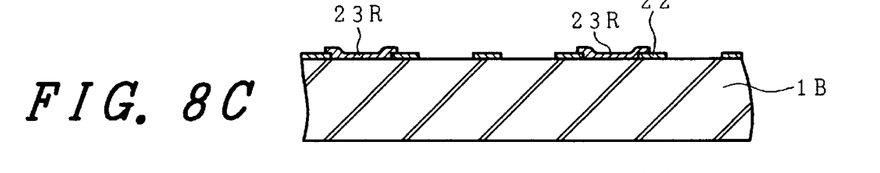

Step C, FIG. 8C

Next, form a synthetic resin layer that contains therein pigment of the color red (R), for example, in the entire area on the surface of the transparent substrate 1B, including the black matrix layer 22 also.

Then, deposit a photoresist film in the entire area of the surface of this synthetic resin layer in such a way as to let by photolithography techniques the photoresist film reside only in those regions corresponding to the color filter (R) formation regions while removing any other portions.

Further, with the residual photoresist film used as a mask, etch said synthetic resin layer which was exposed from this photoresist film.

Thus, it is possible, by removing the photoresist film used as the mask, to obtain a color filter layer 23R of a predefined pattern.

Figure 8D:
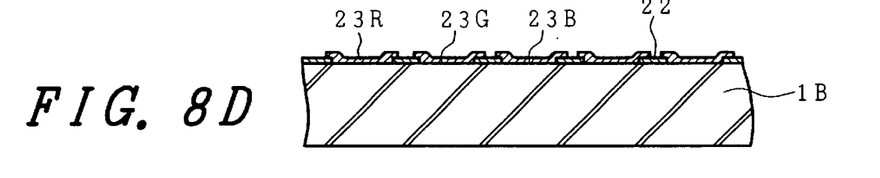

Step D, FIG. 8D

Thereafter, form a color filter layer 23G for the color green in a process similar to that described above; also, form a color filter layer 23B for the color blue in a process similar to that described above.

Figure 8E:
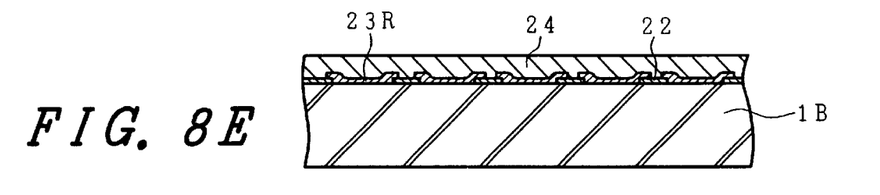

Step E, FIG. 8E

Next, form the flat, planarized film 24 in the entire area of the surface of the transparent substrate, including the black matrix layer 22 and color filter 23 also. This flat film 24 may be a SiO2 film, SiN film or the like as formed by chemical vapor deposition (CVD) methods, for example; alternatively, the film may be a synthetic resin layer formed by deposition process or any equivalent techniques thereof.

Figure 8F:
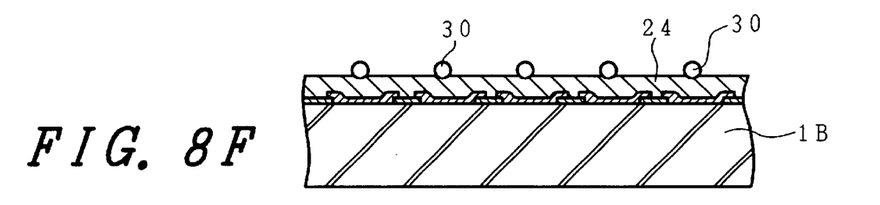

Step F, FIG. 8F

Let the spacer beads 30 be scattered or distributed on the surface of the flat film 24. And, perform heat application processing.

Figure 8G:
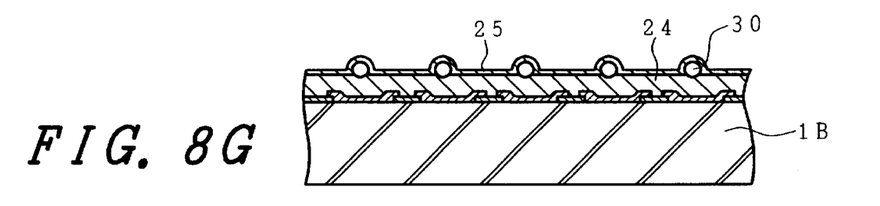

Step H, FIG. 8G

Form an orientation film.

According to the liquid crystal display device in accordance with the embodiment described above, several advantages can be obtained as will be presented below.

Since the spacer beads 30 placed between the transparent substrates 1A, 1B are fixed to the side of one transparent substrate 1B, it becomes possible to eliminate movement of the spacer beads 30.

The spacer beads 30 are so arranged as to be fixed to the flat film 24 underlying the orientation film 25, wherein they are covered by the orientation film 25.

This is in order to prevent a change in state of orientation of the liquid crystal from increasing at locations around the spacer beads 30, by employing such specific arrangement in which the spacer beads 30 are also covered by the orientation film 25.

In addition, the arrangement is such that in the case where the spacer beads 30 are fixed to the orientation film 25, it is possible to avoid the need for any complicated works including the one that requires attachment of adhesive or the like against the surfaces of the spacer beads 30, and the like.

In other words, this is because where the spacer beads 30 are fixed to the flat film 24, it becomes possible to firmly adhere them to the flat film 24 by distributing the spacers prior to hardening of the flat film and then effectuating appropriate thermal processing in the hardening process.

Additionally, the liquid crystal display device in accordance with the prescribed embodiment is arranged so that the spacer beads are immovably attached to a specific one of the pair of transparent substrates 1A, 1B of the device—namely, the transparent substrate 1B on the side on which the pixel electrodes 18 and counter electrodes 14 are not formed.

Due to the fact that the respective electrodes are not formed, the flat film 24 is, formed beneath the orientation film 25 which must be formed to come into contact with the liquid crystal used; consequently, it becomes possible to attain the intended structure capable of achieving rapid and tight attachment to this orientation film 25 without having to specifically modify any other portions thereof.

For instance, in cases where a certain electrode (typically, formed beneath the orientation film) was formed on the transparent substrate on the side with the spacer beads being firmly attached, the electrode must be required to undergo certain redesign procedure such as for formation beneath an associated insulating layer or the like, which would result in an electric field between the electrode and another electrode being generated through the insulating layer, which in turn leads to a drawback that the electric field affecting the liquid crystal decreases in intensity.

Furthermore, the liquid crystal display device in accordance with the aforesaid embodiment is arranged such that any possible step-like differences which can be formed due to the layout with the black matrix layer 22 and color filter 23 partly overlapping each other will be forced by the flat film 24 to be hardly observable on the surface thereof Accordingly, it becomes possible to render uniform the "scattered" distribution layout of the spacer beads 30 on the planarized film 24 surface while at the same time enabling achievement of uniformalization of adhesion on the planarized film surface 24.

In the above-described embodiment, adhesion of the spacer beads 30 is carried out with respect to one transparent substrate of the respective transparent substrates 1A, 1B which is on the side with none of the pixel electrode 18 and counter electrode 14 being formed thereon.

However, it would be readily appreciated that the invention should not exclusively be limited to this, and that adhesion may alternatively be done with respect to the transparent substrate 1A which is on the side with the pixel electrode 18 and counter electrode 14 being formed thereon.

In this case, the spacer beads 30 are to be fixed to the protective film 19.

It is apparent from the foregoing explanation that according to the liquid crystal display device of the present invention, it becomes possible to eliminate occurrence of display irregularity due to movement of the spacer beads.

What is claimed is:

1. The method for forming a liquid crystal display device having a liquid crystal layer interposed between first and second substrates and an electrode structure formed on the first substrate for generating an electric field having a component predominantly in parallel with the first substrate, the method comprising the steps of:

forming an insulating layer on one of the first and second substrates;

providing spacer materials on the insulating layer;

forming an orientation film over the spacer materials; and superposing the first and second substrates and sealing liquid crystal molecules of the liquid crystal layer therebetween so that the orientation film is in contact with the layer of the liquid crystal molecules;

wherein the spacer materials are provided on the insulating film prior to hardening of the insulating film.

2. The method according to claim 1, wherein the insulating film is hardened by application of heat thereto.

* * * * *